(12) United States Patent
Pedersen (10) Patent No.: US 8,732,671 B2
(45) Date of Patent: May 20, 2014

(54) GENERATING STACK TRACES OF CALL STACKS THAT LACK FRAME POINTERS

(75) Inventor: Søren Sandmann Pedersen, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 734 days.

(21) Appl. No.: 12/714,356

(22) Filed: Feb. 26, 2010

(65) Prior Publication Data

US 2011/0214109 A1 Sep. 1, 2011

(51) Int. Cl.
*G06F 9/44* (2006.01)
(52) U.S. Cl.
USPC ............ 717/128; 717/122; 717/124; 717/127
(58) Field of Classification Search
CPC ............. G06F 9/44; G06F 11/36; G06F 8/84; G06F 9/455
USPC .................................. 717/128, 122, 124, 127
See application file for complete search history.

(56) References Cited

U.S. PATENT DOCUMENTS

| | | | |
|---|---|---|---|
| 7,178,132 B2 | 2/2007 | Pierce | |
| 7,533,246 B2 * | 5/2009 | Taylor | 712/34 |
| 7,574,702 B2 | 8/2009 | Goldin et al. | |
| 7,971,100 B2 * | 6/2011 | Dowling et al. | 714/38.1 |
| 8,347,273 B2 * | 1/2013 | Nageshappa et al. | 717/133 |
| 8,429,632 B1 * | 4/2013 | Coutant et al. | 717/151 |
| 2004/0250242 A1 * | 12/2004 | Berry et al. | 717/128 |
| 2007/0038896 A1 * | 2/2007 | Champlin et al. | 714/38 |
| 2007/0150871 A1 * | 6/2007 | Barsness et al. | 717/128 |
| 2008/0091978 A1 * | 4/2008 | Brodsky et al. | 714/38 |
| 2009/0007075 A1 * | 1/2009 | Edmark et al. | 717/128 |
| 2009/0113398 A1 * | 4/2009 | Birkill et al. | 717/128 |
| 2010/0064179 A1 * | 3/2010 | Champlin et al. | 714/38 |
| 2010/0180261 A1 * | 7/2010 | Lin et al. | 717/128 |
| 2010/0333071 A1 * | 12/2010 | Kuiper et al. | 717/128 |
| 2011/0016357 A1 * | 1/2011 | Tsvetkov | 714/38 |
| 2011/0072418 A1 * | 3/2011 | Kalamegham et al. | 717/128 |

OTHER PUBLICATIONS

Copperman, Max, "Producing an Accurate Call-Stack Trace in the Occasional Absence of Frame Pointers", Mar. 1992, 17 pages, Board of Studies in Computer and Information Sciences, University of California at Santa Cruz, Santa Cruz, California.

* cited by examiner

*Primary Examiner* — Idriss N Alrobaye
*Assistant Examiner* — Getente A Yimer
(74) *Attorney, Agent, or Firm* — Lowenstein Sandler LLP (57) ABSTRACT

A processing device executing an application analyzer analyzes a call stack having a plurality of stack frames to identify potential return addresses for the plurality of stack frames. The processing device records a value of each of the potential return addresses and records a location on the call stack for each of the potential return addresses. The processing device then determines which of the potential return addresses are actual return addresses based on debugging information and the recorded locations of the potential return addresses. The processing device generates a stack trace based on the actual return addresses.

17 Claims, 6 Drawing Sheets

GENERATING STACK TRACES OF CALL STACKS THAT LACK FRAME POINTERS

TECHNICAL FIELD

Embodiments of the present invention relate to software development, and more specifically to generating stack traces of call stacks that lack frame pointers.

BACKGROUND

In software engineering, a profiler is an application that monitors another application (used herein interchangeably with the term program) and gathers runtime information from the monitored application while that application operates. The profiler determines information about that application's behavior based on the gathered runtime information. A profiler is typically used to identify an application's performance bottlenecks to help a software engineer improve the application.

One method used by profilers to monitor an application is to generate stack traces of that application during runtime. A stack trace is a report of active stack frames in a call stack for the monitored application at a particular point during execution of the application, where each stack frame corresponds to an uncompleted function. Most profilers generate stack traces by following a linked list of frame pointers that are included in the call stack, where each frame pointer points to a location on the call stack of a preceding stack frame. However, in some instances some or all stack frames on the call stack do not have frame pointers. In such instances, the profiler generates the stack trace by walking through the call stack and recording each portion of the call stack that appears to be a return address. This method commonly produces false positives, in which a region of the call stack that appeared to include a return address did not actually include a return address. Thus, stack traces of call stacks that include one or more stack frames lacking frame pointers are often not accurate.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for generating stack traces. In one embodiment, a processing device executing an application analyzer analyzes a call stack having a plurality of stack frames to identify potential return addresses for the plurality of stack frames. The analyzed call stack may include one or more stack frames that lack frame pointers. The processing device records a value of each of the potential return addresses and records a location for each of the potential return addresses, wherein the location is a location on the call stack. The processing device then determines which of the potential return addresses are actual return addresses based on debugging information and the recorded locations and values of the potential return addresses. The processing device generates a stack trace based on the actual return addresses. In one embodiment, the call stack is analyzed by a first component of the application analyzer that runs in a kernel context and the stack trace is generated by a second component of the application analyzer that runs in a user context.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "analyzing", "recording", "generating", "determining", "identifying", "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Figure 1:
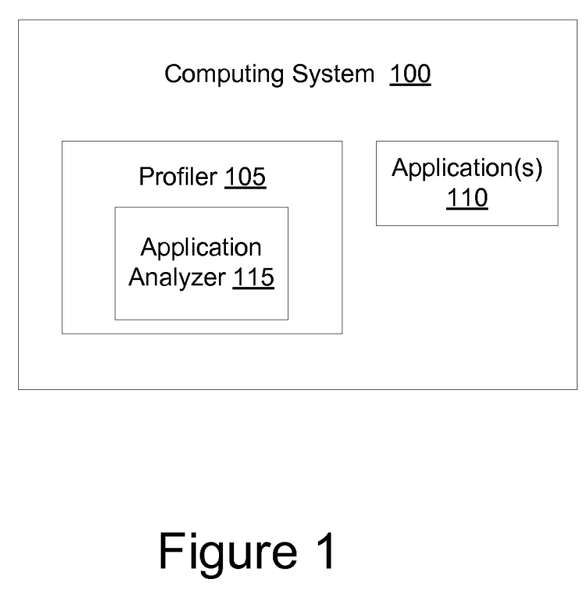
FIG. 1 illustrates an exemplary computer system, in which embodiments of the present invention may operate.

FIG. 1 illustrates a block diagram of an exemplary computing system 100, in which embodiments of the present invention may operate. The computing system 100 may be a desktop computer, laptop computer, server (e.g., web server), personal digital assistant (PDA), etc. The computing system 100 may be an individual computing device or a cluster of multiple computing devices.

The computing system 100 includes a profiler 105, and one or more applications 110 to be examined. The applications 110 may be any type of application or program, such as a game, word processor, spreadsheet, server application, browser, operating system, virtual machine, and so on. The applications 110 may be stand alone applications, or may be components of other applications. For example, the applications 110 may be portions of a larger application that handle particular functionality for that larger application.

The profiler 105 monitors the one or more applications 110, and gathers information from the monitored application 110 while that application 110 operates. In one embodiment, the profiler 105 profiles the application 110 by periodically polling the application 110 to determine a currently executing function, method, routine, subroutine or operation (hereinafter referred to simply as a function) and/or underlying active functions in a call stack (e.g., to determine information about the application's runtime state). In one embodiment, profiler 105 includes an application analyzer 115 that samples the runtime state of the executing application. The frequency with which the profiler 105 uses the application analyzer 115 to sample the application's runtime state may be predetermined or user selectable. The application analyzer 115 may sample the application's runtime state, for example, 10 times per second, 100 times per second, 500 times per second, or at some other interval, as directed by the profiler 105. The resulting information provides an indication of what functions of the application 110 consume the most amount of system resources. For example, such information can identify which functions were on top of the call stack the most, and thus which functions were using the most processor resources. Such information can also identify which functions were somewhere on the call stack the most, which signifies that those functions are indirectly responsible for using processor resources.

The application analyzer 115 included in profiler 110 enables profiler 110 to generate stack traces of an application whether or not that application's functions use frame pointers on the call stack. The application analyzer 115 identifies potential return addresses and then for each potential return address verifies whether that potential return address is genuine (e.g., is an actual or real return address). This enables the application analyzer 115 to generate stack traces that do not include any false positive return addresses (locations of the call stack that are reported as return addresses but that are not actually return addresses). Therefore, unlike other profilers that attempt to generate stack traces of call stacks that lack frame pointers, profiler 105 does not generate false positives. Some embodiments of the application analyzer 115 are discussed in greater detail with reference to FIG. 2.

Figure 2:
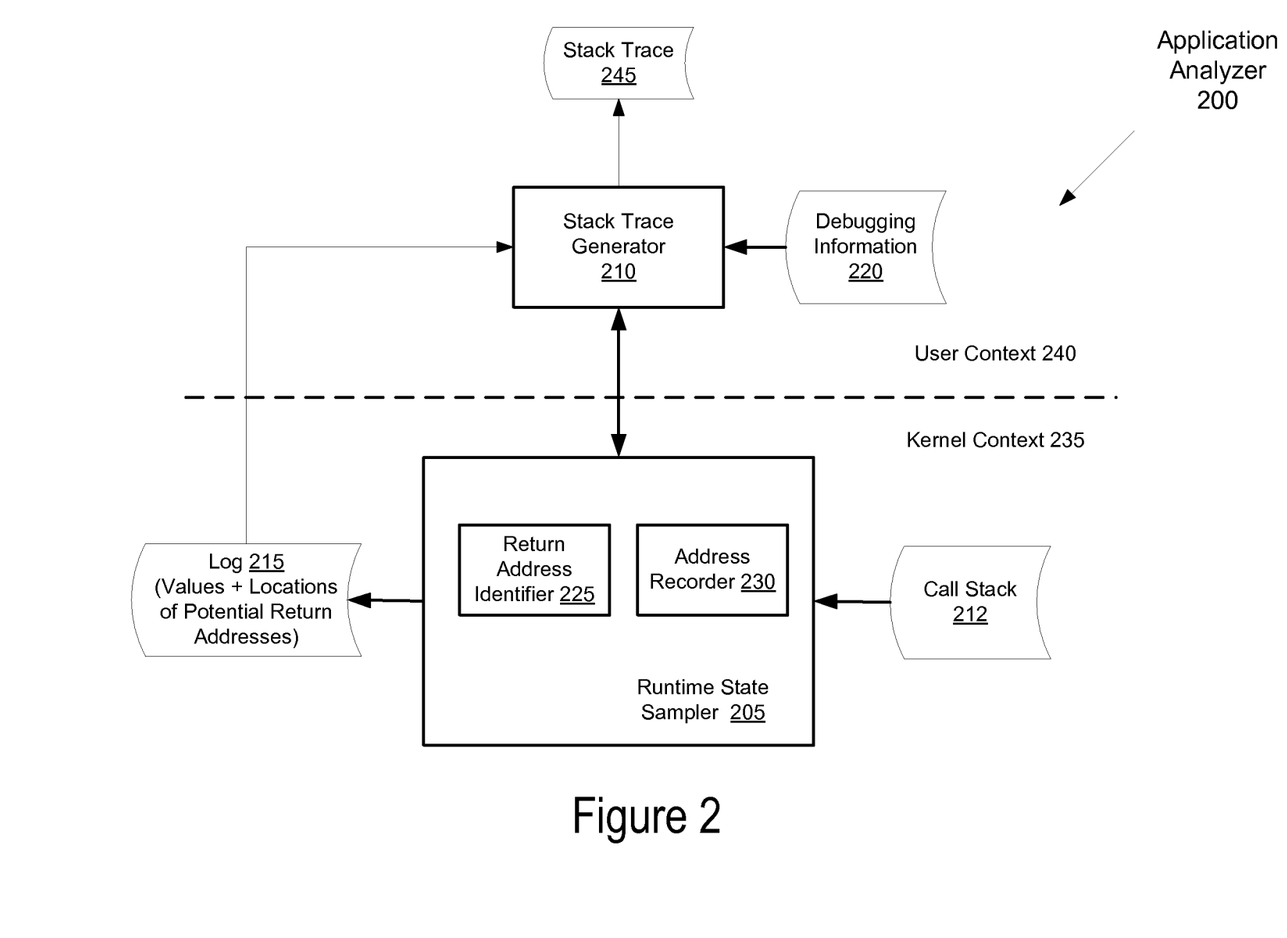
FIG. 2 illustrates one embodiment of an application analyzer.

FIG. 2 illustrates one embodiment of an application analyzer 200. In one embodiment, the application analyzer 200 is a component of a profiler, as shown in FIG. 1. In a further embodiment, application analyzer 200 corresponds to application analyzer 115 of FIG. 1. Alternatively, application analyzer 200 may be a component of a debugger or other software development tool that generates or uses stack traces.

In the illustrated embodiment, the application analyzer 200 includes a runtime state sampler 205 and a stack trace generator 210. The runtime state sampler 205 records portions of a call stack 212 of a running application, and forwards the recorded portions to the stack trace generator 210. This may be performed periodically (e.g., 400 times per second), or upon request. The stack trace generator 210 uses the recorded portions of the call stack 212 and debugging information 220 to generate a stack trace 245 for the running application. By repeating this procedure many times per second (e.g., hundreds of times per second), a statistically significant sample of the runtime state of the monitored application can be obtained.

An operating system includes a kernel context 235 in which privileged instructions associated with a kernel can be run and a user context 240 in which all additional processes not associated with the kernel are run. Some call stacks are readable from the user context. Therefore, to analyze some applications it can be acceptable for the runtime state sampler 205 to run in the user context. However, when the runtime state sampler 205 runs in the kernel context 235, it is capable of sampling call stacks for any applications, including those that are not accessible from user context 240. In one embodiment, the call stack 212 of a running application that is being monitored by the application analyzer 200 is available within the kernel context 235 but not within the user context 240. Accordingly, runtime state sampler 205 may run in the kernel context 235 in order to gain access to the call stack 212.

In one embodiment, debugging information 220 for the monitored application is available in the user context 240 but not in the kernel context 235. Accordingly, stack trace generator 210 may run in the user context 210 in order to gain access to the debugging information 220.

The call stack 212 (also known as an execution stack or runtime stack) is a data structure that stores information about the active functions of an application (or of a particular thread for an application). The call stack 212 keeps track of a point (location of an instruction) to which each active function (a function that has been called but which has not yet completed execution) should return control when it finishes executing. The location of the instruction to which control should be returned is called the return address. The return address is a pointer to an executable mapping of an executing application. The call stack 212 may also keep track of values of local variables associated with a particular function and parameters that are passed to functions by previous functions on the call stack 212.

Figure 3:
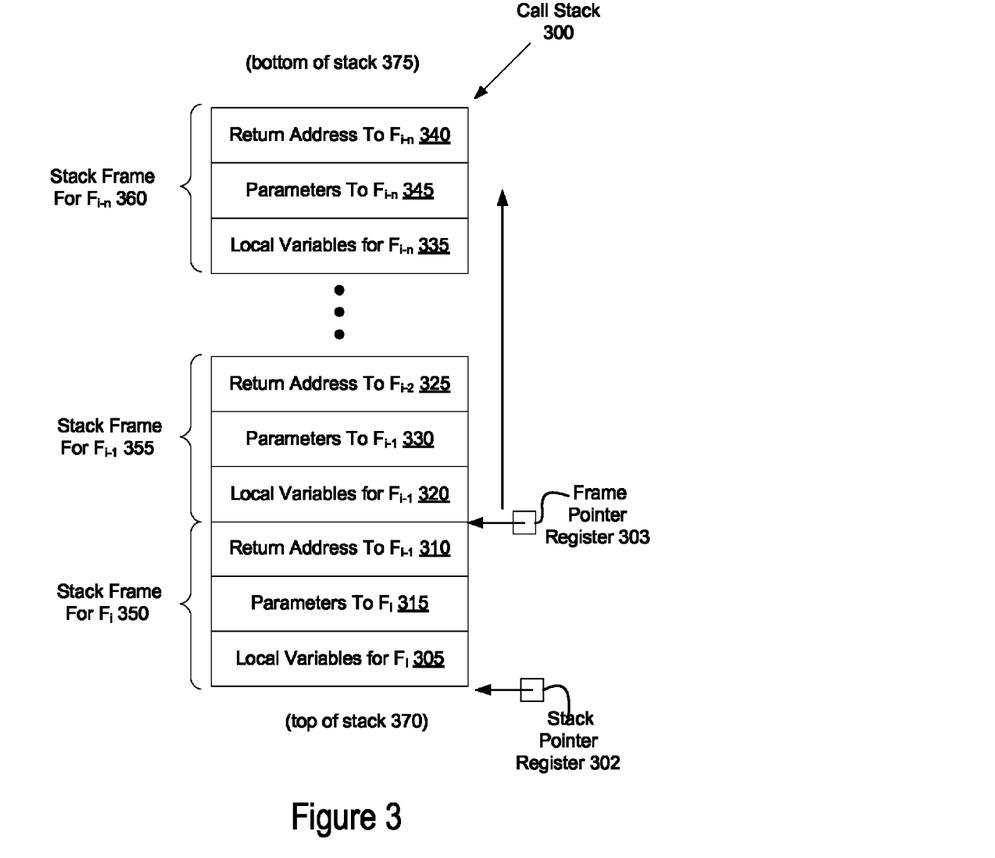
FIG. 3 illustrates one example of a call stack, in accordance with one embodiment of the present invention.

FIG. 3 illustrates one example of a call stack 300, which may correspond to call stack 212 of FIG. 2. The call stack 300 is a contiguous area of memory. The call stack 300 is composed of stack frames 350, 355, 360, where each stack frame includes state information associated with a particular active function. The call stack includes a top 350 and a bottom 355. At the top 350 of the call stack is a stack frame 350 for a currently executing function $F_i$. The next stack frame 355 in the call stack is for a function $F_{i-1}$ that called function $F_i$. Finally, at the bottom 375 of the call stack is a stack frame 360 for a first function $F_{i-n}$.

Each stack frame 350, 355, 360 includes a return address 310, 325, 340 that identifies a location for instructions to return execution control to when a function associated with that stack frame is completed. Each stack frame 350, 355, 360 is also shown to include local variables 305, 320, 335 for an associated function and parameters 315, 330, 345 that are passed to the associated function. All stack frames include a return address 310, 325, 340. However, not all stack frames necessarily include local variables or parameters.

The size and number of variables and parameters associated with stack frames may vary between stack frames. Accordingly, the sizes of stack frames are not uniform. Thus, when a stack frame does not include a frame pointer, it can be difficult to identify where in the call stack the next stack frame begins and ends.

A processor executing a current function (the function having a stack frame at the top of the call stack) includes a stack pointer register 302 that points to the location of the top 370 of the call stack 300. The processor may also include a frame pointer register 303 that points to the return address stored in the top stack frame 350 or to the beginning of the top stack frame. If no frame pointer register 303 is included, or the frame pointer register is not used for the top stack frame 350 (e.g., if frame pointer omission (FPO) optimization is used), the location of the return address may be deduced from the stack pointer register 302. The processor executing the current function may also include an instruction pointer (not shown) that points to the address of an instruction that is executing at the time that the call stack is examined.

Returning to FIG. 2, one of the methods used by the application analyzer 200 to determine information about the runtime state of the application 110 at a given instant in time is to generate a stack trace of the application. This can be initiated by runtime state sampler 205 sampling the call stack 212. Sampling the call stack 212 may include recording portions of the call stack as well as the contents of one or more registers at a particular point in time. For example, the runtime state sampler 205 may obtain the contents of a stack pointer register, an instruction pointer register, a frame pointer register and/or other registers. Alternatively, sampling the call stack 212 includes generating a copy of the entire call stack 212. However, generating a copy of the entire call stack can consume considerable amounts of memory. Therefore, in one embodiment, a copy of the entire call stack is generated when a computing device has sufficient memory resources. In another embodiment, a copy of the entire call stack is generated when the call stack 212 is sampled on command or at relatively low frequencies (e.g., 10 times per second). In one embodiment, to sample the call stack 212, runtime state sampler interrupts the application 110.

In one embodiment, runtime state sampler 205 includes a return address identifier 225 that walks through the call stack 212 to identify return addresses in the call stack. Preferably, the return address identifier 225 will identify and record a value for the return address included in each stack frame. To do this, the return address identifier 225 includes a heuristic algorithm that searches for portions of the call stack that resemble return addresses. In one embodiment, sections of the call stack that resemble pointers to an executable mapping are identified as potential return addresses. The kernel will have a table of mappings for each application, and that table of mappings will contain (among other data items), a range of addresses of the mapping, and whether the mapping is executable. Therefore, a potential return address may be a pointer on the call stack to an address that is within the range of addresses for an executable mapping.

Whenever a portion of the call stack is found that resembles a return address, the return address identifier 225 records the value of the potential return address. The heuristic algorithm used by return address identifier 225 may be designed to minimize or eliminate the potential for false negatives (e.g., to ensure that no actual (e.g., real, genuine or physical) return addresses are missed). This may have a side effect of causing an occasional false positive (in which a return address is identified where there was no actual (e.g., real, genuine or physical) return address).

For each potential return address, address recorder 230 records a location on the call stack where the potential return address is found. The value and location for each potential return address may be stored in a log 215. The log 215 may also store values of registers, such as the instruction pointer register, stack pointer register and frame pointer register. Once the values and locations for all of the return addresses on the call stack are recorded, the log may be passed to stack trace generator 210.

Stack trace generator 210 retrieves the debugging information 220 and walks through the contents of the log 215 using the debugging information 220. The debugging information 220 can translate a currently executing processor instruction to a source file and line of code. It provides links between the expressions of a high level programming language and the raw bytes of an executing application. The debugging information 220 may include names and locations of functions and variables, link lines of source code to lines of an executable file, store type information for functions, store a symbol table, etc. Thus, the debugging information can be used to examine and analyze an internal layout for an application.

Stack trace generator 210 determines which recorded potential return address locations are referenced by the debugging information. Those potential return addresses whose locations on the call stack are referenced by the debugging information are identified as actual (e.g., real or physical) return addresses, while those that are not referenced are identified as false positives.

In one embodiment, the stack trace generator 210 looks up the value of the instruction pointer and/or a return address of the first stack frame in the debugging information. The debugging information 220 indicates what the stack frame at the top of the call stack should resemble given that instruction pointer and/or return address. More particularly, the debugging information 220 identifies a location in memory where the next stack frame should be located given the instruction pointer and/or return address. The identified location may point directly to the location at which a return address should be located. In this case, the identified location in memory will correspond to one of the addresses of the call stack recorded by address recorder. Alternatively, the identified location may point to the approximate location on the call stack at which the return address should be located. The identified location may also point to a location where a next stack frame begins, and the return address may be located somewhere within that stack frame. In this case, the location of the return address can be identified based on the recorded addresses in the log and knowledge of approximately where in the stack frame the return address should be located.

Stack trace generator 210 then looks at the value of the recorded potential return address at the identified location in the debugging information. This identifies another location in memory where the next stack frame should be located. The identified location may be used to determine one of the next potential return addresses based on its associated location on the call stack. This process continues until the stack trace generator 210 has walked through the entire log 215. Those potential return addresses that were referenced by the debugging information are determined to be actual return addresses. Those potential return addresses that were not referenced by the debugging information are determined to be false return addresses, and are deleted. The stack trace generator 210 then generates a stack trace 245 from the actual (e.g., real or genuine) return addresses.

Thus, the application analyzer 200 can generate stack traces of call stacks in which some or all of the stack frames lack frame pointers. These stack traces provide valuable metrics about monitored applications, such as the memory usage of specific objects and execution times of specific functions, methods and operations. This information can identify performance bottlenecks for the application. Thus, the application analyzer 200 provides data that can be used to increase the speed and reduce the memory usage of monitored applications.

Note that in an alternative embodiment to those described above with reference to FIG. 2, the runtime state sampler 205 generates a potential stack trace (e.g., which may correspond to log 215). The stack trace generator 210 then uses the debugging information and information in the potential stack trace to remove false positives from the potential stack trace. The output is then an actual (e.g., real or physical) stack trace 245.

Figure 4:
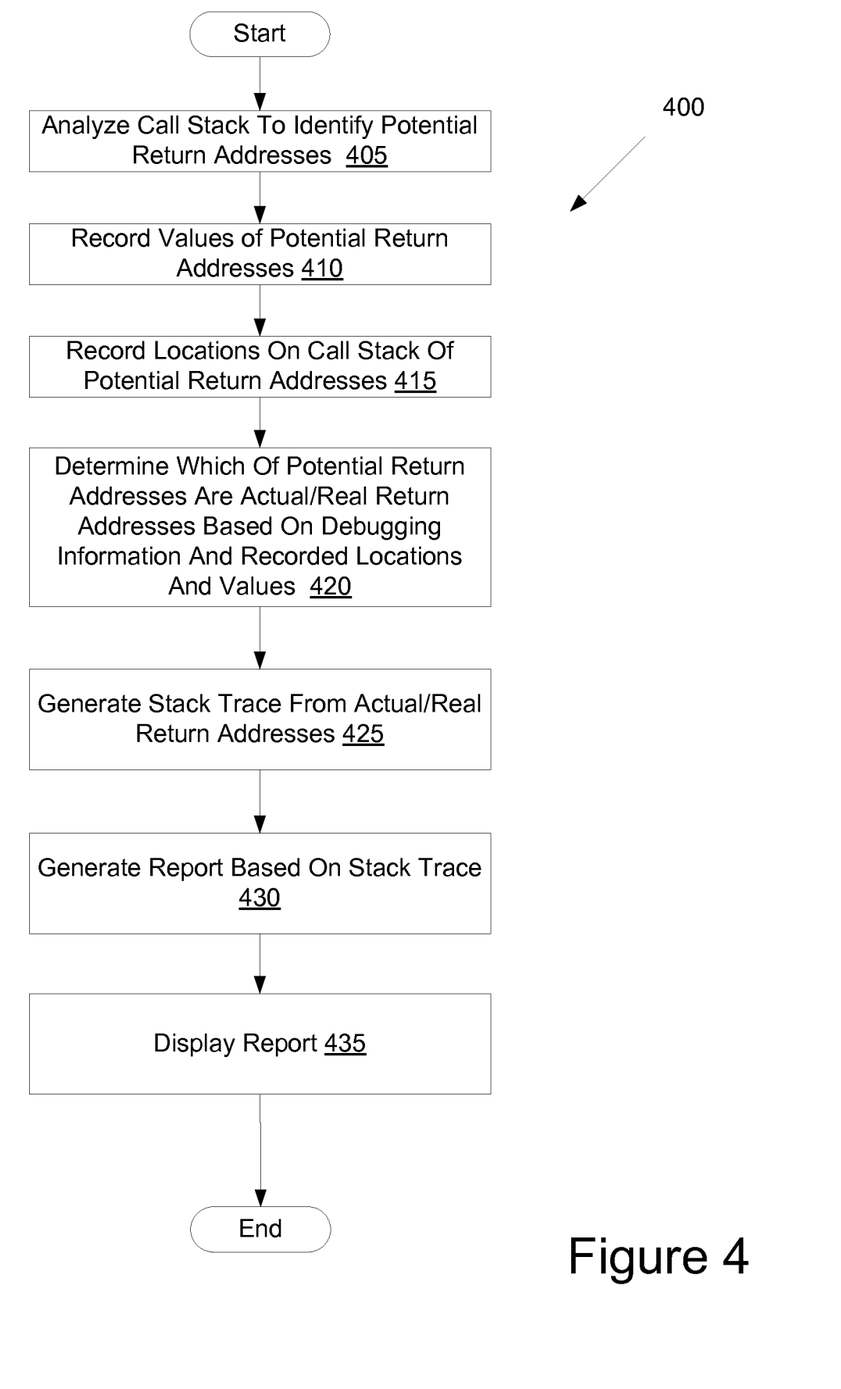
FIG. 4 illustrates a flow diagram of one embodiment for a method of generating stack traces.

FIG. 4 illustrates a flow diagram of one embodiment for a method 400 of generating stack traces of an application's runtime state. The method may be performed by processing logic that may comprise hardware (e.g., circuitry, dedicated logic, programmable logic, microcode, etc.), software (such as instructions run on a processing device), or a combination thereof. In one embodiment, method 400 is performed by application analyzer 200 of FIG. 2.

Referring to FIG. 4, at block 405 of method 400, processing logic analyzes a call stack of an application that is executing to identify potential return addresses. In one embodiment, a heuristic return address detecting algorithm is used for identifying potential return addresses. Regions of the call stack having properties that match criteria included in the heuristic algorithm are identified as potential return addresses. At block 410, the processing logic records values of the potential return addresses. At block 415, the processing logic records locations on the call stack of the potential return addresses. The locations on the call stack of a potential return address may be recorded as a pointer to a particular address, or may be recorded as an offset from a particular location on the call stack (e.g., an offset from the top of the call stack). The addresses and values of the potential return addresses may be placed in a preliminary stack trace or other log. In one embodiment, the operations of blocks 405, 410 and 415 are performed by a first component of an application analyzer that runs in a kernel context of an operating system.

At block 420, the processing logic determines which of the potential return addresses are actual (e.g., real or physical) return addresses based on debugging information and the recorded locations and values of the potential return addresses. The processing logic may also use recorded registers such as an instruction pointer register, stack pointer register or frame pointer register to help identify which of the potential return addresses are actual return addresses. At block 425, the processing logic generates a stack trace from the actual return addresses. In one embodiment, the operations of blocks 420 and 425 are performed by a second component of the application analyzer that runs in a user context of an operating system.

In one embodiment, in which the application analyzer is a component of a profiler, at block 430, processing logic generates a report based on the stack trace and one or more additional stack traces of the application. At block 435, processing logic displays the report to a user. The report may include statistical runtime information. For example, the report may include a percentage of system resources that, on average, a particular function of the application consumes. The report may include the average system resources consumed by each function, or by those functions that consume the most resources. The report may identify to a user which functions should be optimized to increase performance of the application.

Figure 5:
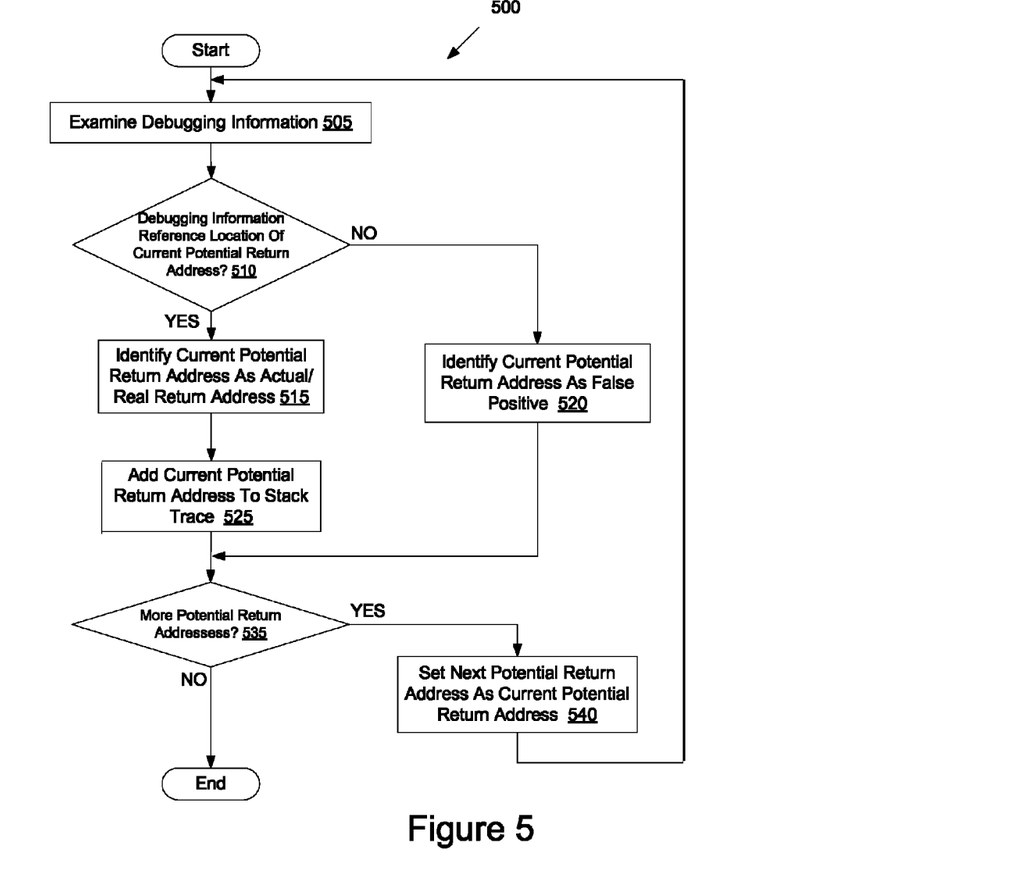
FIG. 5 illustrates a flow diagram of one embodiment for a method of determining whether potential return addresses are actual return addresses.

FIG. 5 illustrates a flow diagram of one embodiment for a method 500 of determining whether potential return addresses are actual (e.g., real, genuine or physical) return addresses. The method may be performed by processing logic that may comprise hardware (e.g., circuitry, dedicated logic, programmable logic, microcode, etc.), software (such as instructions run on a processing device), or a combination thereof. In one embodiment, method 500 is performed by application analyzer 200 of FIG. 2. In one embodiment, method 500 is performed by block 420 of method 400.

Referring to FIG. 5, at block 505 of method 500, processing logic examines debugging information. A particular portion of the debugging information may be examined using the values of one or more registers and/or the value of a previous potential return address (e.g., if the current return address is not the first potential return address).

At block 510, processing logic determines whether the debugging information references a location of a current potential return address. In one embodiment, processing logic looks up a recorded instruction register and/or previous potential return address, and determines whether the debugging information then points to the recorded location on the call stack of the current potential return address. For example, the instruction pointer register and return address of an executing application having a stack frame at the top of the call stack may be provided to the debugging information. Based on the instruction pointer register and/or the value of the return address for the executing application, the debugging information may indicate that the next return address will be located at a particular address on the call stack.

The debugging information may reference the recorded address, an address space that includes the recorded address, or an address that is near the recorded address. In any of these instances, the method may continue to block 515. If the debugging information does not reference the recorded location on the call stack of the current potential return address (e.g., does not point to the actual location, or an address range that includes the location), the method continues to block 520.

If the current potential return address has a location on the call stack that is referenced by the debugging information, then the current potential return address is an actual return address. Thus, at block 515, processing logic identifies the current potential return address as an actual return address. At block 525, processing logic adds the current potential return address to a stack trace. The method then continues to block 535.

If the current potential return address has a location on the call stack that is not referenced by the debugging information, then the current potential return address is not an actual return address. Thus, at block 520, processing logic identifies the current potential return address as a false return address, and fails to add the current potential return address to the stack trace. This may include deleting the current potential return address from the recorded log. The method continues to block 535.

At block 535, processing logic determines whether there are any additional potential return addresses. If there are additional potential return addresses, the method proceeds to block 540, and sets the next potential return address as the current potential return address, after which the method returns to block 505. If there are no additional potential return addresses, the method ends.

Figure 6:
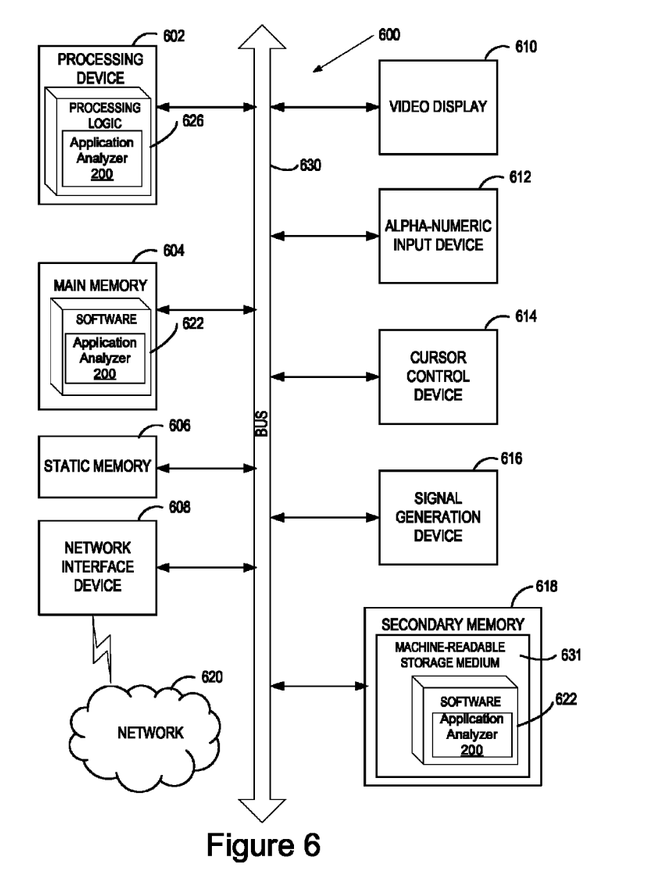
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 631 may also be used to store the profiler 105 of FIG. 1, application analyzer 200 of FIG. 2 and/or a software library containing methods that call the profiler 105 and/or application analyzer 200. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    analyzing, by a processing device executing an application analyzer, a call stack of an application, the call stack having a plurality of stack frames, to identify potential return addresses for the plurality of stack frames, wherein the potential return addresses are pointers to an address within a range of addresses for an executable mapping of the application;
    recording a value of each of the potential return addresses;
    recording a location for each of the potential return addresses, the location being a location on the call stack;
    determining which of the potential return addresses are actual return addresses in view of debugging information and the recorded locations and values of the potential return addresses, wherein each potential return address is determined to be an actual return address in response to the potential return address being referenced by the debugging information or determined to be a false address in response to the potential return address not being referenced by the debugging information; and
    generating a stack trace addresses in view of the actual return addresses, wherein the analyzing and recording are performed by a first component of the application analyzer that executes in a kernel context, and wherein the determining and generating are performed by a second component of the application analyzer that executes in a user context.

2. The method of claim 1, wherein the application analyzer is a component of a profiler that analyzes the call stack at regular intervals, the method further comprising:
    generating a report that identifies functions of the application that consume the most system resources; and
    displaying the report, wherein a user optimizes the application addresses in view of the displayed report.

3. The method of claim 1, wherein at least some of the stack frames do not have frame pointers.

4. The method of claim 1, further comprising:
recording an instruction pointer for the call stack; and
using the instruction pointer, in addition to the debugging information and the recorded locations and values of the potential return addresses, to determine which of the potential return addresses are actual return addresses.

5. The method of claim 1, wherein determining which of the potential return addresses are actual return addresses comprises:
determining locations of the call stack referenced by the debugging information; and
identifying each of the potential return addresses having a location on the call stack that is referenced by the debugging information as an actual return address.

6. The method of claim 5, further comprising:
following instructions embedded in the debugging information to determine the locations of the call stack referenced by the debugging information.

7. A non-transitory computer readable storage medium including instructions that, when executed by a processing device, cause the processing device to perform operations comprising:
analyzing, by the processing device executing an application analyzer, a call stack of the application, the call stack having a plurality of stack frames to identify potential return addresses for the plurality of stack frames, wherein the potential return addresses are pointers to an address within a range of addresses for an executable mapping of the application;
recording a value of each of the potential return addresses;
recording a location for each of the potential return addresses, the location being a location on the call stack;
determining which of the potential return addresses are actual return addresses in view of debugging information and the recorded locations and values of the potential return addresses, wherein each potential return address is determined to be an actual return address in response to the potential return address being referenced by the debugging information or determined to be a false address in response to the potential return address not being referenced by the debugging information; and
generating a stack trace addresses in view of the actual return addresses, wherein the analyzing and recording are performed by a first component of the application analyzer that executes in a kernel context, and wherein the determining and generating are performed by a second component of the application analyzer that executes in a user context.

8. The non-transitory computer readable storage medium of claim 7, wherein the application analyzer is a component of a profiler that analyzes the call stack at regular intervals, the operations further comprising:
generating a report that identifies functions of the application that consume the most system resources; and
displaying the report, wherein a user optimizes the application addresses in view of the displayed report.

9. The non-transitory computer readable storage medium of claim 7, wherein at least some of the stack frames do not have frame pointers.

10. The non-transitory computer readable storage medium of claim 7, the operations further comprising:
recording an instruction pointer for the call stack; and
using the instruction pointer, in addition to the debugging information and the recorded locations and values of the potential return addresses, to determine which of the potential return addresses are actual return addresses.

11. The non-transitory computer readable storage medium of claim 7, wherein determining which of the potential return addresses are actual return addresses comprises:
determining locations of the call stack referenced by the debugging information; and
identifying each of the potential return addresses having a location on the call stack that is referenced by the debugging information as an actual return address.

12. The non-transitory computer readable storage medium of claim 11, the operations further comprising:
following instructions embedded in the debugging information to determine the locations of the call stack referenced by the debugging information.

13. A computing device comprising:
a memory; and
a processing device coupled to the memory to:
analyze a call stack of an application, the call stack having a plurality of stack frames to identify potential return addresses for the plurality of stack frames, wherein the potential return addresses are pointers to an address within a range of addresses for an executable mapping of the application;
record a value of each of the potential return addresses;
record a location for each of the potential return addresses, the location being a location on the call stack;
determine which of the potential return addresses are actual return addresses in view of debugging information and the recorded locations and values of the potential return addresses, wherein each potential return address is determined to be an actual return address in response to the potential return address being referenced by the debugging information or determined to be a false address in response to the potential return address not being referenced by the debugging information; and
generate a stack trace addresses in view of the actual return addresses, wherein the analyzing and recording are performed by a first component of the application analyzer that executes in a kernel context, and wherein the determining and generating are performed by a second component of the application analyzer that executes in a user context.

14. The computing device of claim 13, wherein the processing device is further to generate and display a report that identifies functions of the application that consume the most system resources, wherein a user optimizes the application addresses in view of the displayed report.

15. The computing device of claim 13, wherein at least some of the stack frames do not have frame pointers.

16. The computing device of claim 13, wherein the processing device is further to record an instruction pointer for the call stack and to use the instruction pointer, in addition to the debugging information and the recorded locations and values of the potential return addresses, to determine which of the potential return addresses are actual return addresses.

17. The computing device of claim 13, wherein to determine which of the potential return addresses are actual return addresses, the processing device determines locations of the call stack referenced by the debugging information, and identifies each of the potential return addresses having a location on the call stack that is referenced by the debugging information as an actual return address.

* * * * *